United States Patent [19]

Park

[11] Patent Number: 4,995,659
[45] Date of Patent: Feb. 26, 1991

[54] SHOCK ABSORBER FOR A CAR

[76] Inventor: Heung Jong Park, 410-4 Beon 1-Dong, Dobong-ku, Seoul, Rep. of Korea, 132-061

[21] Appl. No.: 372,341
[22] PCT Filed: Oct. 15, 1988
[86] PCT No.: PCT/KR88/00021
§ 371 Date: Jun. 8, 1989
§ 102(e) Date: Jun. 8, 1989
[87] PCT Pub. No.: WO89/03328
PCT Pub. Date: Apr. 20, 1989

[30] Foreign Application Priority Data

Oct. 15, 1987 [KR] Rep. of Korea ............... 17572/1987

[51] Int. Cl.⁵ .............................................. B60R 19/00
[52] U.S. Cl. .................... 293/107; 293/126; 293/128
[58] Field of Search ............... 293/107, 108, 110, 126, 293/127, 128, 134, 1; 188/372

[56] References Cited

U.S. PATENT DOCUMENTS

| 3,110,515 | 11/1963 | Loftin | 293/127 |
| 3,598,437 | 8/1971 | Harris | 293/127 |
| 3,708,194 | 1/1973 | Amit | 293/1 |
| 3,718,356 | 2/1973 | Gabella | 293/134 X |
| 3,726,556 | 4/1973 | West | 293/127 |
| 3,752,522 | 8/1973 | Speer | 293/134 |
| 3,764,174 | 10/1973 | Taninecz | 188/372 X |
| 3,822,076 | 7/1974 | Mercier et al. | 293/107 |
| 4,352,514 | 10/1982 | Orima | 293/134 X |

Primary Examiner—Robert R. Song
Attorney, Agent, or Firm—Darby & Darby

[57] ABSTRACT

An apparatus for absorbing and relieving the shock inflicted from outside at the time of collision of a car which covers the majority of the covering portions that may be contacted from outside by tubular air sheets in which pressed air of helium gas is filled. Each of the front and rear bumpers comprises three bumpers members each for low, medium and high pressure shock absorption with different volumes and gas capacity. Each of the front and rear bumpers and the left and right side panels are interconnected by longitudinal and transverse gas circulation pipes that the gase of each air sheet can be dispersed when the shock is inflicted, thereby enhancing the shock absorption effect thereof. The gas circulation tubes are interconnected by a gas circulation controller which controls the circulation of gas.

3 Claims, 4 Drawing Sheets

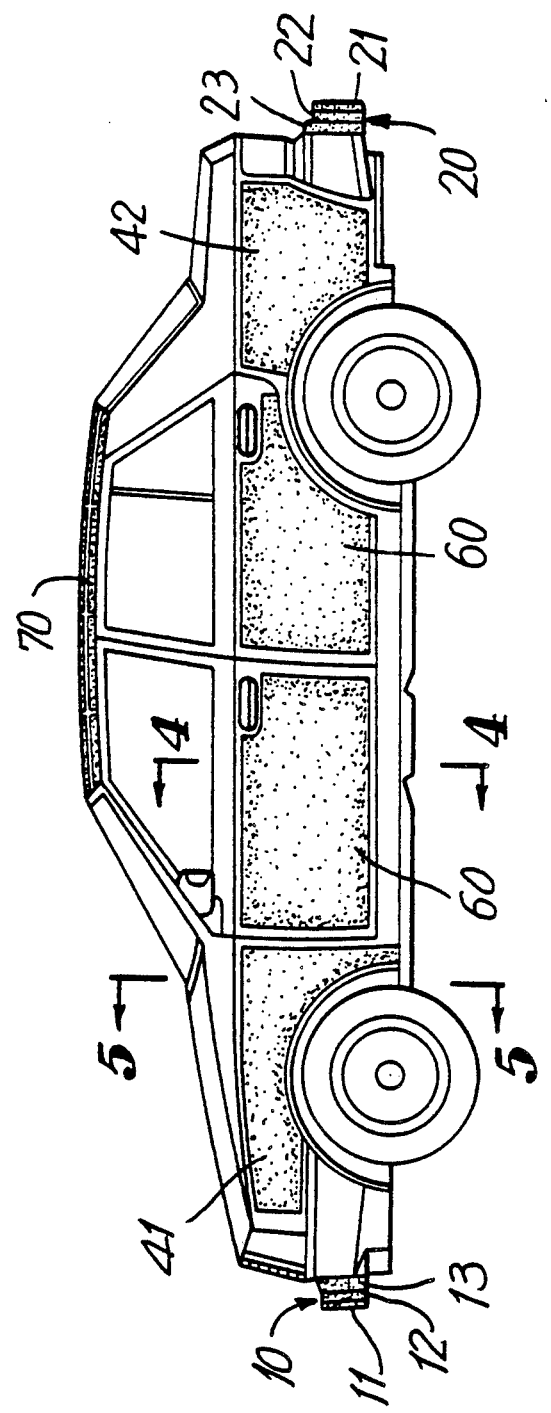

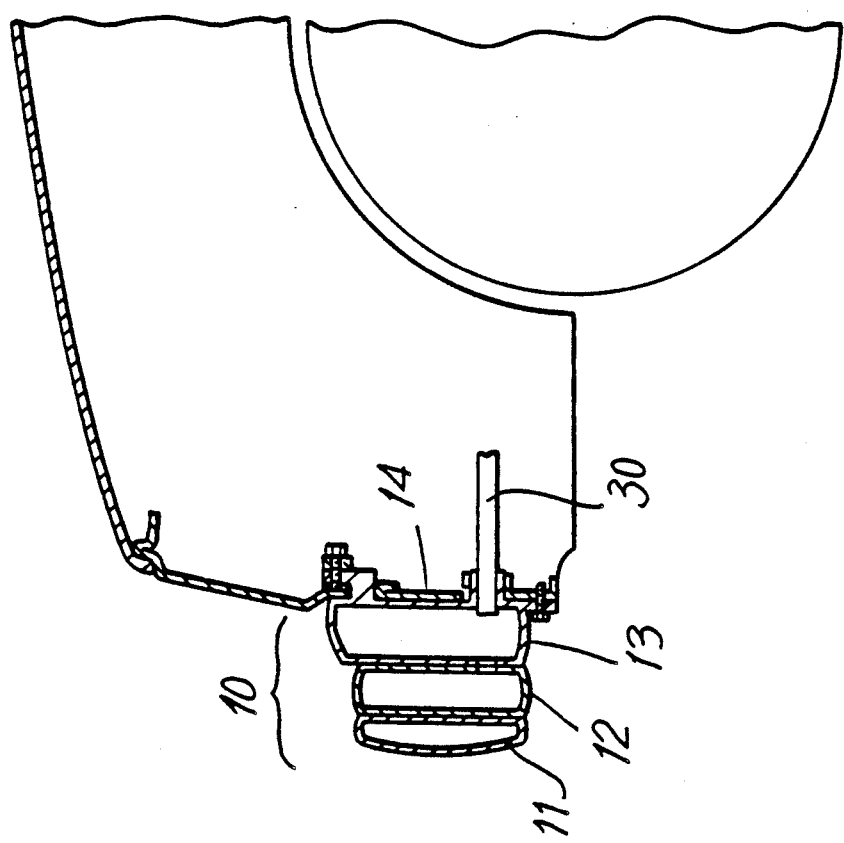

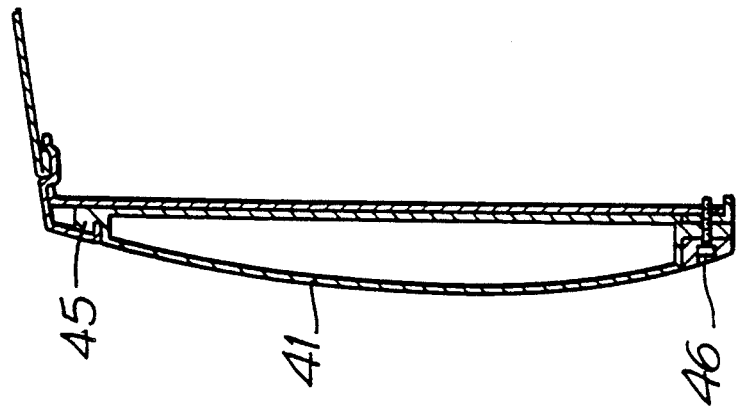
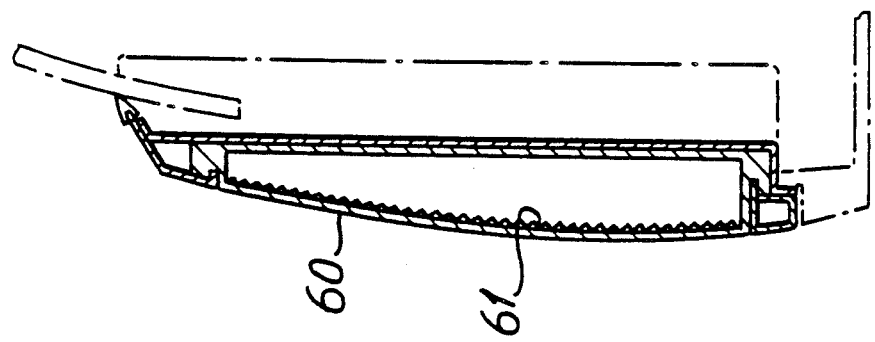

SHOCK ABSORBER FOR A CAR

FIELD OF THE INVENTION

The present invention relates to a shock absorber for a car, and more specifically relates to a shock absorber for a car in which external portions of the car that may be contacted from the outside such as the roof, the doors and the front and rear side panels, as well as the front and rear bumpers, are formed with air sheets filled with compressed air or helium gas, so that a shock inflicted from outside at the time of a collision or overturn of the car can remarkably be absorbed and relieved.

BACKGROUND OF THE RELATED ART

Generally in conventional cars, as is well known, the front and rear bumpers using relief effect of spring or oil pressure are mounted at both the front and rear of a car for absorbing or relieving a shock at the time of collision of the car. However, although the conventional bumpers may be effective in event of a slight collision, they are considerably insufficient for protecting the occupants or the car body in case of a collision during high speed driving. Further, in case that the car is hit from a side or falls or is overturned, since a separate apparatus for relieving or absorbing the shock is not provided in the prior art, not only is the body of a car easily damaged, but also the occupants get hurt and can even be killed by the shock.

SUMMARY OF THE INVENTION

Therefore, a primary object of the present invention is to provide a shock absorber for a car in which the safety of the occupants is secured as far as possible by allowing relief of shock inflicted to a car by absorbing the shock, even in the case of overturn due to the collision from a side, a fall, or front collision.

Another object of the present invention is to provide a shock absrober for a car in which a shock is absorbed in a step manner by constructing the front and rear bumpers with a three stage structure for low, medium and high pressure shoch absorption, so that the shock absorption effect is remarkably enhanced.

A further object of the present invention is to provide a shock absorber for a car in which the gas circulation tubes are interconnected among the front and rear bumpers and the right and left side in case that the car is hit from the front or rear and from the right or left, thereby a puncture caused by an instantaneous shock is prevented and also the shock absorbing effect is enchanced due to the dispersion of the gas.

The present invention also aims to use a helium gas which is light in specific gravity and is non explosive in time of collision. The air sheet is filled with helium gas and is formed with a tube like shape so that, in case that a material of the air sheet is applied with a metal plate having high strength, the shock can be absorbed.

The present invention also intends to provide a shock absorber for a car in which almost the whole part of the external covering portion of a car is structured with the air sheets and thereby buoyancy occurs so that, in case the car falls into water, drowning of the occupants is prevented.

The present invention aims also to provide a shock absorber for a car in which a mechanical noise or the like of an engine is absorbed by the gas-filled air sheets.

In order to attain the above objects, the present invention is comprised of front and rear bumpers which are each made of a bumper member of low, medium and high pressure shock absorption filled with an air or gas of predetermined pressure and each having different thicknesses and gas capacity. An air sheet filled with a gas and conforming to the shape of and mounted to the front and rear side panels, an air sheet filled with a gas of predetermined pressure and conforming to the shape of and mounted to the doors of a car, and an air sheet filled with a gas of predetermined pressure conforming to the shape of the roof are provided. A longitudinal gas circulation tube is arranged longitudinally within the body of a car so that a front bumper member for the medium and high pressure shock absorption and a rear bumper member for the medium and high pressure shock absorption are interconnected to allow communication of the gas. A lateral gas circulation tube is arranged laterally within the body of a car to intersect said longitudinal gas circulation tubes, and which interconnects the air sheets for the right and left side panels. Gas circulation control means is arranged at a point of intersection of said longitudinal gas circulation tubes and said lateral gas circulation tubes so that the circulation of gas is controlled.

BRIEF DESCRIPTION OF THE DRAWINGS

FIG. 2 is a side view of a car showing an embodiment of the invention.

FIG. 3 is an enlarged sectional view taken along the lines III—III of FIG. 1.

FIG. 4 is an enlarged sectional view taken along lines IV—IV of FIG. 2.

FIG. 5 is an enlarged sectional view taken along lines V—V of FIG. 2.

DETAILED DESCRIPTION OF THE INVENTION

Figure 1:
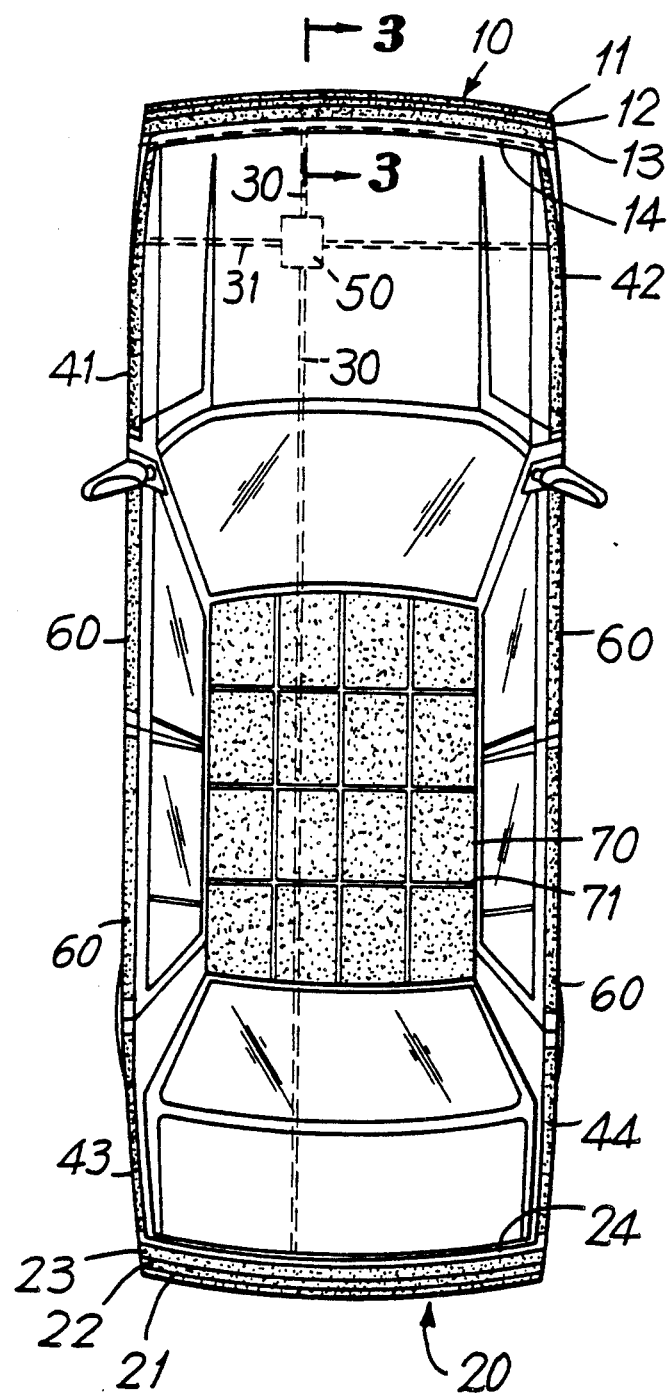
FIG. 1 is atop plan view of a car showing an embodiment of the present invention.

Hereafter, the shock absorber for a car of the present invention will be described in detail with reference to the accompanying drawings. FIG. 1 and FIG. 2 show an embodiment of the present invention, in which a front bumper 10 is mounted at a front part of a car and supported with a front bumper supporting plate 14 which is constructed with the bumper members 11, 12 and 13 for the low, medium and high pressure shock absorption, respectively. The bumper member 11, 12 and 13 are filled in their interior with a gas of predetermined pressure and have different thicknesses and gas capacity. Similarly, a rear bumper 20 which in constructed with the bumper member 21, 22 and 23 for the low, medium and high pressure shock absorption, respectively, is mounted at arear part of the body of a car and supported with a rear bumper supporting plate 24. The bumper members 11, 21 for low pressure shock absorption of front and rear bumpers 10, 20 are made to absorb a relatively light shock because their thicknesses are thin and their gas pressure is low relative to the other bumper members 12, 13 or 22, 23. The bumper members 12, 13 for the medium and high pressure shock absorption of front bumper 10 and the bumper members 22, 23 for the medium and high pressure shock absorption of rear bumber 20 are connected to each other by longitudinal gas circulation tubes 30 to allow circulation of the gases. Further, air sheets 41, 42, 43 and 44 conform to the shape of and are mounted on the front and rear side panels of the car body. The air sheets 41, 42 for the side panels of the right and left at the front part are connected to each other by lateral gar circulation tube 31 to allow circulation of the gases.

At a location in which said longitudinal gas circulation tubes 31 intersects said lateral gas circulation tubes 30, a gas circulation control means 50 is connected, so that the air circulation among the front and rear bumpers 10, 20 and the air sheets 41, 42 for the right and left side panels can be controlled or interrupted. Aforesaid gas circulation control means 50 in usual conditions is maintained in the opened position so that the longitudinal and the lateral gas circulation tubes 30, 31 can communicate with each other; but in case that, for example, an air sheet 41 for a side panel of one side were punctured due to a shock from outside, then a valve for automatic control, or other similar valve, could be employed which functions to instantaneously prevent leakage of the compressed gas within another side air sheet 42 or the front and rear bumpers 10, 20 throgh the punctured portion.

In addition, air sheets 60 and 70 filled with gas in its interior conforms to the shape of and is mounted on to the right and left doors and to the roof respectively.

As for the foresaid front and rear bumpers 10, 20, a material is used in which the anti-pressure, anti-heat and anti-shock characteristics are excellent and which has a restoring force to the original state to enable instant return to its former condition if a shock is inflicted. Preferably a special engineering rubber, laminated fiber or the like which has these characteristics is utilized.

As for the air sheets for said side panels, doors and roof, either the materials enumerated above for the aforesaid bumpers 10, 20 can be utilized, otherwide the empty portions maintained gas-tight are formed at the interior by utilizing a metal plate provided with the external features of the car, to which empty portions the gases are impregnated, thereby the effect of an air sheet can be obtained. Particulary, as an example shown in FIG. 4, the air sheets 60 for doors and air sheet 70 for the roof, can have their strength enhanced by providing wire nets 61 on the internal surface of the external covers. In addition, an example of a method for mounting each air sheet is shown in FIG. 5. The mounting hooks 45 are formed with the material of relatively high strength at the peripheral portions of the sheet member, of which corresponding portions at a car body are bent, and they are meshed to each other and thereby mounted; otherwise a mounting method utilizing the screws or bolts 46 can be utilized. In the case where the air sheets are formed with an elastic material such as a rubber at the portions suc as the roof, the side panels or the doors, in order that a central portion will expand by a high pressure gas filled into the interior of said sheet, as an example, above the roof shown in FIG. 1, seam lines 71 are formed for prevention reinforcement. The gases which are filled into the interior of each air sheet including the front and rear bumpers 10, 20 should be nonexplosive and it is preferable that the specific gravity becomes lighter. Therefore, through the filling of air is suitable, it is preferable to fill it with a helium gas which possess all of the aforementioned conditions.

According to the present invention as aforementioned, since the structure of a bumper is formed with a triple structure for the low, medium and high pressure shock absorption, a relatively light shock can be absorbed at a low pressure shock absorption bumper, and in the event that a strong shock is inflicted, the stepped shock absorption can be obtained by the low, medium and high pressure shock absorption bumpers, at the same time. At a moment inflicted with a shock, the gas of the portion directly receiving the shock is dispersed respectively through the lateral and longitudinal gas circulation tubes, thereby the shock absorption effect is remarkably increased.

Further, even if a car is inflicted with side collision or overturned as a result of a fall, since the shocks can be minimized by the air sheets which surround the right and left side panels the doors and the roof etc., the safety of the occupants is improved. Additionally, the riding feeling can be enhanced as a result of absorbing the engine noise of a car by the air sheets surrounding the body of a car. Moreover, by filling the air sheets with a helium gas, which specific gravity is lighter, into the interior of the air sheet, buoyancy is obtained in case that the car falls into water, thereby preventing drowning of the occupants.

I claim:

1. A shock absorber for a car comprising front and rear bumpers, said front and rear bumpers each comprising a bumper member for low pressure shock absorption, medium pressure shock absorption and high pressure shock absorption, each of said bumper members being filled with a gas of predetermined pressure, each of said low, medium, and high pressure shock absorption members of different thickness and gas capacity; an air sheet filled with a gas and conforming to the shape of and mounted to the front and rear left and right side panels of the car, ; an air sheet filled with a gas and conforming to the shape of and mounted to the doors of the car; an air sheet filled with a gas, conforming to the shape of a roof of the car and mounted thereto, a longitudinal gas circulatin tube mounted longitudinally with the body of the car and which interconnect the front bumper members, for medium and high pressure shock absorption with the rear bumper members, for medium and high pressure shock absorption so that the gases of the interior thereof can be circulated; a lateral gas circulation tube mounted laterally within the body of the car so as to intersect said longitudinal gas circulation tube and which interconnects the air sheets for the left and right front side panels so that the gas or the interior thereof can be circulated; and gas circulation control means which controls the gas circulatin by being mounted at a points of intersection of said longitudinal gas circulation tube and said lateral gas circulation tube.

2. A shock absorber for a car according to claim 1, wherein said gas contained in the front and rear bumpers and each of said air sheets is a helium gas.

3. A shock absorber for a car according to claim 1, wherein said air sheets mounted on the doors comprise a wire net to provide increased strength.

* * * * *